United States Patent [19]

King et al.

[11] Patent Number: 4,666,763

[45] Date of Patent: May 19, 1987

[54] FIBER BATTS AND THE METHOD OF MAKING

[75] Inventors: Charles L. King, Chicago, Ill.; Nicholas J. Mussro, Jr., Doylestown, Pa.; Dennis W. Roberts, Weaverville, N.C.

[73] Assignee: Akzona Incorporated, New York, N.Y.

[21] Appl. No.: 679,429

[22] Filed: Dec. 7, 1984

[51] Int. Cl.$^4$ .............................................. B32B 19/00
[52] U.S. Cl. .................................. 428/221; 210/510; 264/112; 264/115; 264/41; 264/53; 428/288; 428/357; 428/903; 428/920; 428/297; 428/224; 156/306.6
[58] Field of Search .............. 428/224, 288, 297, 299, 428/303, 397, 398, 400, 221, 903, 920, 357; 264/112, 115, 41, 53; 210/510; 156/306.6

[56] References Cited

U.S. PATENT DOCUMENTS

| | | | |
|---|---|---|---|
| 4,361,617 | 11/1982 | Suzuki et al. | 428/400 |
| 4,405,688 | 9/1983 | Lowery et al. | 428/398 |
| 4,460,648 | 7/1984 | Kondo et al. | 428/400 |
| 4,515,859 | 5/1985 | De Maria | 428/397 |

Primary Examiner—James J. Bell
Attorney, Agent, or Firm—Francis W. Young; David M. Carter; Louis A. Morris

[57] ABSTRACT

There is provided a fiber batt made from a plurality of entangled synthetic fibers arranged in a random fashion, forming a nonwoven structure. Each fiber contains a plurality of substantially spherically shaped void spaces. The batts may be made by an extrusion/blowing technique. It has been found that the batts are particularly useful as thermal insulators, as oil and water separators, and in controlled release applications.

42 Claims, 5 Drawing Figures

FIBER BATTS AND THE METHOD OF MAKING

BACKGROUND OF THE INVENTION

This invention relates to fiber batts. More particularly, it relates to fiber batts which are particularly useful as thermal insulators, as oil and water separators, and in controlled release applications.

In the late 1960s, Esso (now Exxon) Research and Engineering Company developed a process for forming fiber batts by melt blowing a polymer through a specifically structured die and collecting the fibers on a substrate. An example of the Exxon process is disclosed in U.S. Pat. No. 3,684,415.

Figure 1:
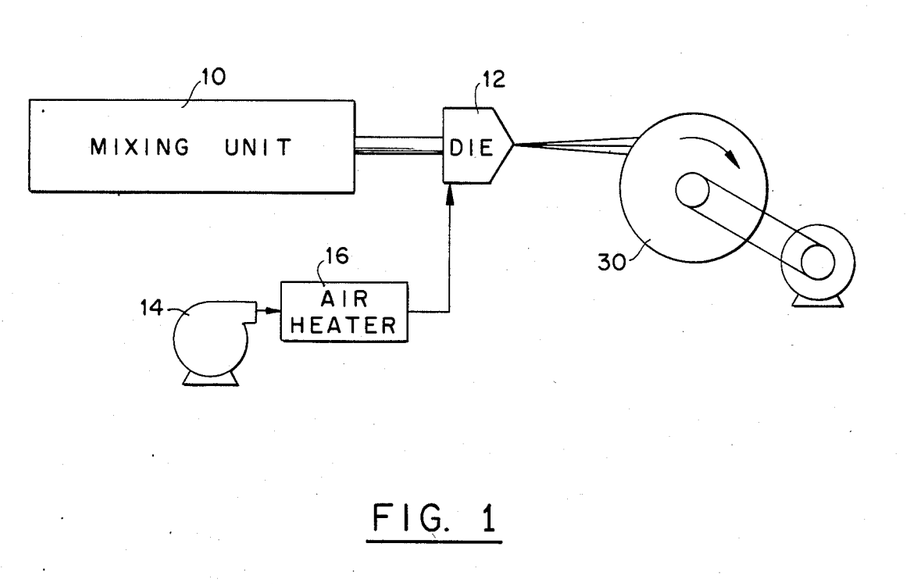
FIG. 1 is a schematic diagram showing, in general form, an apparatus which is useful in the subject invention in simplified form.
Figure 2:
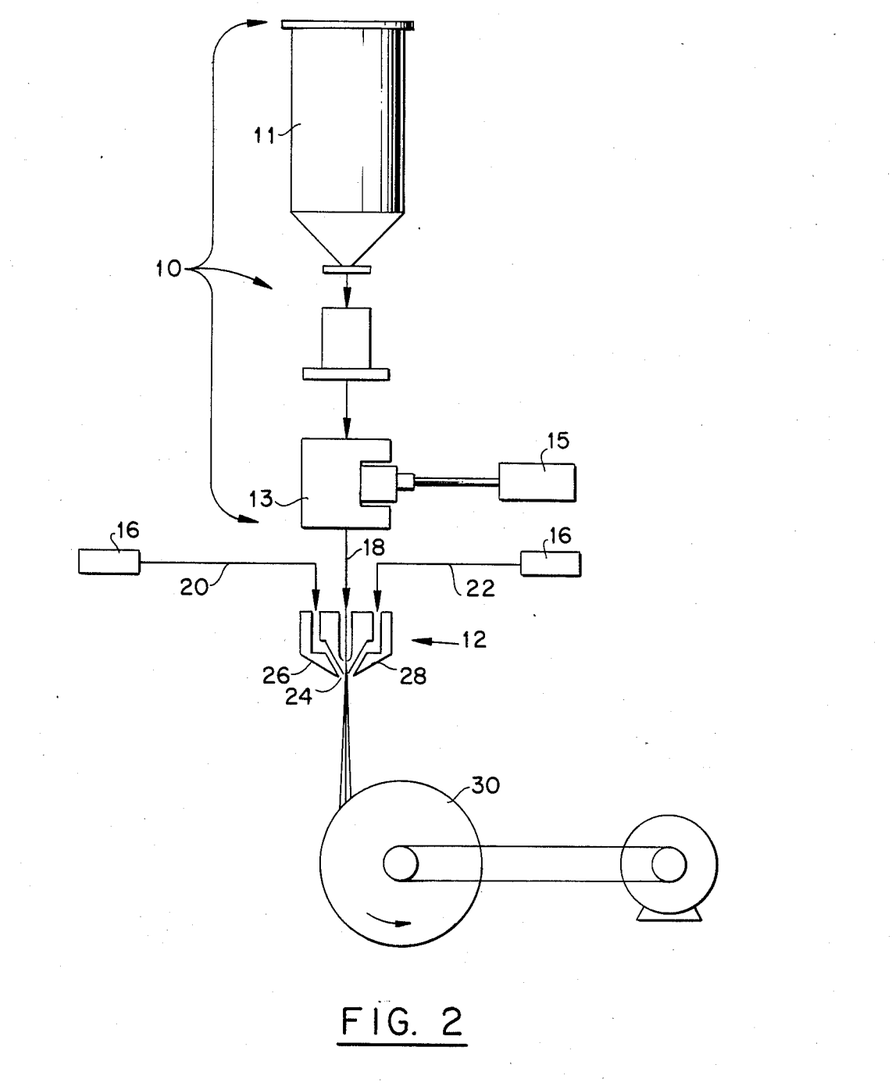
FIG. 2 is a diagram in more specific form of the apparatus of FIG. 1, including a sectional view of a die useful in the process shown in FIG. 1.

The Exxon melt blowing process can be better understood in reference to FIG. 1, which shows, in a general form, an apparatus used in the Exxon process, and to FIG. 2 which shows, inter alia, a useful die head. Turning now to FIG. 1, polymer chips such as, for example, polypropylene, are loaded into extruder 10, where they are heated until the polymer is transformed into a liquid. The extruder screw forces the polymer through die 12 which is also pneumatically connected to blower 14 through air heater 16.

As can be seen from FIG. 2, the molten polymer passes through bore 18 of die head 12. The die head includes a plurality of holes therein (not shown) for providing multiple filaments. The heated air from blower 14 passes through chambers 20 and 22, and the hot air and molten polymer meet at junction 24. Cool air passes along the outer surfaces 26 and 28 of the die head, and strikes the blown fibers just past junction 24. The streams of hot and cool air will draw the filaments. Depending on the flow rate of the air, the filaments can be overdrawn and broken, forming short filaments.

Turning again to FIG. 1, the fibers strike take-up screen 30, which may be rotated. The fibers accumulate on top of each other, and as the fibers hit the take-up screen, they are still in a partial molten form, and thus stick together, forming a batt. The batt then may be wound by means of a take-up spool.

Some of the uses which Exxon suggests for the polypropylene batt are as a filtration media, as an absorbent, as a cigarette filter, as well as other uses.

Fibrous batts of synthetic polymer material made by other processes have become popular for several uses, in particular for thermal insulation in garments and sleeping bags. Recently, very thin batts have been developed which provide excellent insulation properties and are thus very popular in the fashion industry. A leading example of this type of thin insulating batt is a product manufactured by Minnesota Mining & Manufacturing Company called Thinsulate. The Thinsulate material, together with the method of manufacture, is described in U.S. Pat. No. 4,118,531. Thinsulate is a mixture of microfibers and crimped bulky fibers, which produces a lofty resilient web having high thermal resistance per unit thickness, as well as light weight. These fibers are standard solid core polymers in staple form. Complicated tangling of the microfibers and the larger bulky fibers provide for dead air among the fibers, resulting in good insulation properties.

Another example of one of a new insulating batt is shown in U.S. Pat. No. 4,304,817, assigned to E. I. DuPont de Nemours & Company. The DuPont patent shows a fiber-filled blend made into a batt, wherein the fibers are heat-bonded to one another. Very low denier fibers are utilized, together with a binder fiber, so that the batt is relatively thin for its particular thermal characteristics.

Another new insulating material is called Eizac, developed by Teijin Ltd., of Japan. The Eizac is a nonwoven fabric made by a so-called polyester burst fiber process. Each fiber includes dead air in the fiber itself in elongated channels through the core of the fibers.

Many of the above described batts have several drawbacks for use as a thermal insulation. Some of the fibers are hydrophilic; that is, they absorb moisture, which increases the thermal conductivity. Also, many of them appear to be very difficult to manufacture. Furthermore, when the above described 3M and DuPont insulation batts are subjected to load, as, for example, on the bottom side of a sleeping bag, the batt collapses, and the thermal insulation qualities are substantially decreased.

OBJECTS OF THE INVENTION

It is, therefore, one object of this invention to provide an improved fibrous batt.

It is another object to provide an improved method for the manufacture of a fibrous batt, wherein the fibers themselves have a plurality of void spaces therein.

It is still another object to provide an improved insulation material.

It is another object to provide a thin-insulation batt which does not lose a substantial amount of its insulation value under normal weight loads.

It is another object to provide a fibrous batt useful as an oil and water separator.

It is yet another object to provide a fibrous batt useful as a controlled release material.

SUMMARY OF THE INVENTION

In accordance with one form of this invention, there is provided a fibrous batt having a plurality of synthetic fibers arranged in a random fashion relative to and being entangled to form a lofted non-woven structure. The fiber or fibers are made of a polymeric material containing a plurality of substantially spherically shaped void spaces.

The batt may be formed by heating a mixture of base polymer and a compatible liquid for a sufficient time to form a homogeneous solution. The solution is forced through a narrow die, preferably having a plurality of holes, and a gas is blown onto the solution as it passes out of the die, forming a plurality of fibers which are then cooled. The fibers are entangled and are collected onto a substrate in batt form. The compatible liquid is then removed from the polymer, leaving pores in the polymer. The batt is useful as a thermal insulation, particularly in conjunction with clothing and sleeping bags. Where the batt is subject to loading, the insulation characteristics do not substantially change. The batts may also be utilized as an oil and water separator, as well as in controlled release applications.

DESCRIPTION OF THE PREFERRED EMBODIMENT

Figure 3:
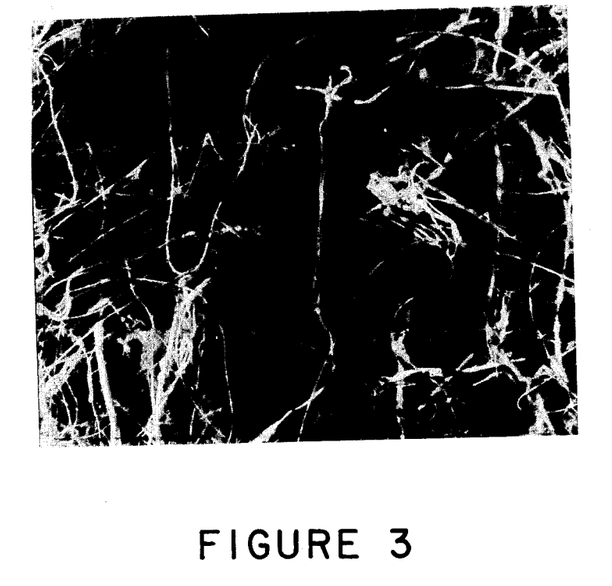
FIG. 3 is a photograph of a portion of a fiber batt of the subject invention.

There is provided a fibrous batt having a plurality of entangled interconnected randomly placed fibers, as exemplified in FIG. 3. Preferably, the fibers include large filaments, as well as very small filaments. Normally, the fiber diameters will vary from 2 to 70 microns, although globes of non-filamentary material with diameters as large as 9,375 microns have been observed in a bath. It is also preferred that the fibers are each formed of continuous filaments so that the batt will have structural integrity without the need for the fibers to bond to one another, although normally many adjacent fibers will be melt-bonded to one another.

Figure 4:
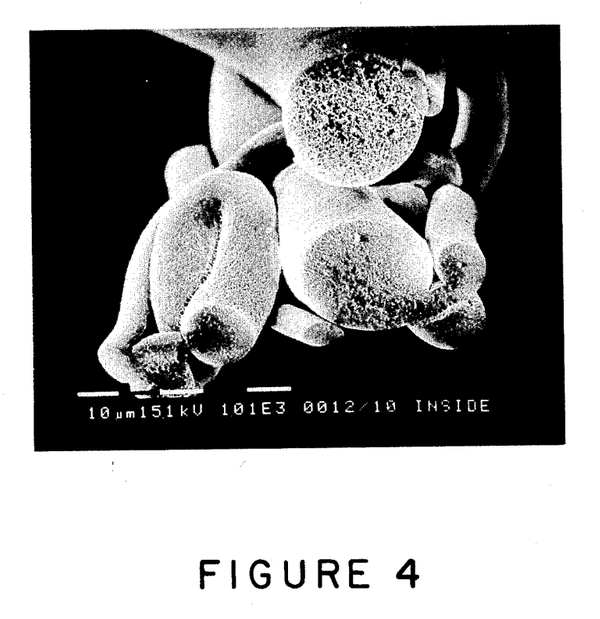
FIG. 4 is a photo-micrograph of a cross-section of a group of fibers which form the batt of FIG. 3.

As can be seen in FIG. 4, each fiber includes a plurality of spherically shaped pores or void spaces. As used herein, the term "spherically shaped" is used in a general sense to mean a somewhat enclosed chamber with somewhat rounded walls. This may be better seen in reference to FIG. 5, which is a close-up micrograph of the material showing the adjacent spherical shaped pores. The pores may be interconnected by narrow channels, although the channels are often difficult to observe. The pores form a three-dimensional matrix within the fiber. It should be noted that the pore structure is not a tunnel or crevice which runs along the entire length of the fiber, which might allow the fiber to be easily crushed under load. It is believed that the pores in each fiber provide for a substantial part of the improved insulation characteristics of the batt. Normally, the batt, when used as insulation, will be placed between two sheets of textile material.

The void spaces, or pores, may vary within the same fiber, from fiber to fiber in the same batting, and from fiber to fiber in different battings, particularly when different base polymers and, more particularly, when different compatible liquids are used. In U.S. Pat. No. 4,287,498, referred to below, where similar materials were disclosed but not in fiber form, the pores were said to range from about ½ micron to about 100 microns in diameter, with a maximum of 50 microns being preferred and with an ideal pore diameter being about 4 microns. The pore sizes of certain of the fibers of the subject invention were observed to vary from fiber to fiber in the same bath from 0.5 microns to 1.1 microns. The average pore diameter was observed to be approximately 4 microns. The base material was polypropylene (30 wt. %), and the compatible liquid was a mixture of soybean oil (52 wt. %) and castor oil (18 wt. %) before extraction of the oils.

The fact that the fibers of the subject invention are formed with a porous matrix is important in the preservation of the thermal insulation characteristics of the fiber while the batt itself is being compressed under load. Furthermore, in that very small and some larger fibers are normally in the batt, the insulation characteristics of the batt are greatly improved over a batt which has a single in size filament while maintaining the structural integrity of the batt. The larger fibers provide for bulk in the batt, while the smaller fibers are entangled with each other and with the large bulk fibers. The bulk fibers act as separators within the batt to produce a lofty resilient batt. Air is thus trapped around the fine fibers in the batt, and also within the spherically shaped pores in each fiber, thus producing a very good thermal insulating batt which may be made very thin. Also, if a hydrophobic polymer is chosen for the fiber, such as polypropylene, the batt will not take up water, thus further enhancing the batt's value as an insulator in damp environments.

Furthermore, the batt of the subject invention may serve as an oil and water separating device. If the polymer used to form the fiber is hydrophobic, the batt will absorb oil, and if the fiber is hydrophilic, the batt will absorb water.

Also, in that each individual fiber includes a plurality of interconnected voids, including voids which are exposed to the surface of the fiber, i.e., no skin, the batt will serve well as a controlled release mechanism. For example, it has been shown that the above-described fibrous batt may be used in conjunction with a smokeless cigarette, whereby the batt is impregnated with nicotine in liquid form, and used in the place of tobacco in a cigarette, with the nicotine gradually being released through the pores and ingested by the user without the need to light the cigarette.

The fibers may be made from various base polymers, including, for example, polypropylene, polyethylene, polyamides and polymethylacrylate The pores in the fibers may be made by the technique set forth in U.S. Pat. No. 4,247,498, entitled Methods for Making Microporous Products, and assigned to Akzona Incorporated. assignee of the present invention. The disclosure set forth in U.S. Pat. 4,247,498 is incorporated herein by reference.

The starting materials used to form the batts of the subject invention are a base polymer and a compatible liquid. Base polymer chips are dissolved in the compatible liquid at an elevated temperature and then fed to mixing unit 10 shown in FIG. 1. The mixing unit could be an extruder or a gear pump. The base polymer should be a synthetic thermoplastic polymer, such as olefinic condensation or oxidation polymers. The compatible liquid which will ultimately form the void spaces in the polymer may be any one of many liquids which are compatible with the base polymer. A preferred compatible liquid for a polypropylene base polymer is N,N-bis(2-hydroxylethyl)tallowamine. Other preferred liquids which may be used are mixtures of liquids such as soybean oil and castor oil. Some of the polymers which may be used as a base polymer are the various types listed below.

Exemplary of the useful non-acrylic polyolefins which may be used as a base polymer are low density polyethylene, high density polyethylene, polypropylene, polystyrene, polyvinylchloride, acrylonitrile-butadiene-styrene terpolymers, styreneacrylonitrile copolymer, styrene butadiene copolymers, poly(4-methyl-pentene-1), polybutylene, polyvinylidene chloride, polyvinyl butyral, chlorinated polyethylene, ethylene-vinyl acetate copolymers, polyvinyl acetate, and polyvinyl alcohol.

Useful acrylic polyolefins include polymethyl-methacrylate, polymethyl-acrylate, ethylene-acrylic acid copolymers, and ethylene-acrylic acid metal salt copolymers.

Polyphenylene oxide is representative of an oxidation polymer which may be utilized. Useful condensation polymers include polyethylene terephthalate, polybutylene terephthalate, polyamides such as nylon 6, nylon 11, nylon 13, nylon 66, polycarbonates and polysulfone.

In forming microporous polymers from polypropylene, below is a list of useful compatible liquids: alcohols such as 2-benzylamino-1-propanol and 3-phenyl-1-propanol; aldehydes such as salicylaldehyde; amides such as N,N-diethyl-m-toluamide; amines such as N-hexyl diethanolamine, N-behenyl diethanol amine, N-coco-diethanolamine, benzyl amine, N,N-bis-$\beta$-hydroxyethyl cyclohexyl amine, N,N-bis-B-hydroxyethyl tallow amine, diphenyl amine and 1,12-diamino dodecane; esters such as methyl benzoate, benzyl benzoate, phenyl salicylate, methyl salicylate and dibutyl phthalate; and esters such as diphenyl ether, 4-bromodiphenyl ester and d benzyl ether have been found useful. In addition, halocarbons such as 1,1,2,2-tetrabromoethane and hydrocarbons such as trans-stilbene and other alkyl/aryl phosphites are also useful as are ketones such as methyl nonyl ketone.

In forming microporous polymers from high density polyethylene, a saturated aliphatic acid such as decanoic acid, primary saturated alcohols such as decyl alcohol, and 1-dodecanol, secondary alcohols such as 2-undecanol and 6-undecanol ethoxylated amines such as N-lauryldiethanolamine, aromatic amines such as N-N-diethylaniline, diesters such as dibutyl sebacate and dihexyl sebacate and ethers such as diphenyl ether and benzyl ether have been found useful. Other useful liquids include halogenated compounds such as octabromodiphenyl, hexabromobenzene and hexabromocyclodecane, hydrocarbons such as 1-hexadecane, diphenylmethane and naphthalene, aromatic compounds such as acetophenonone and other organic compounds such as alkyl/aryl phosphites, and quinoline and ketones such as methylnonyl ketone.

To form microporous polymers from low density polyethylene, the following liquids have been found useful: saturated aliphatic acids including hexanoic acid, caprylic acid, decanoic acid, undecanoic acid, lauric acid, myristic acid, palmitic acid and stearic acid, unsaturated aliphatic acids including oleic acid and erucic acid, aromatic acids including benzoic acid, phenyl stearic acid, polystearic acid and xylyl behenic acid and other acids including branched carboxylic acids of average chain lengths of 6, 9 and 11 carbons, tall oil acids and rosin acid, primary saturated alcohols including 1-octanol, monyl alcohol, decyl alcohol, 1-decanol, 1-dodecanol tridecyl alcohol, cetyl alcohol and 1-heptadecanol, primary unsaturated alcohols including undecylenyl alcohol and oleyl alcohol, secondary alcohols including 2-octanol, 2-undecanol, dinonyl carbinol and diundecyl carbinol and aromatic alcohols including 1-phenyl ethanol, 1-phenyl-1-pentanol, nonyl phenyl, phenylstearyl alcohol and 1-naphthol. Other useful hydroxyl-containing compounds include polyoxyethylene ethers of oleyl alcohol and a polypropylene glycol having a number average molecular weight of about 400. Still further useful liquids include cyclic alcohols such as 4, t-butyl, cyclohexanol and methanol, aldehydes including salicyl aldehyde, primary amines such as octylamine, tetradecylamine and hexadecylamine, secondary amines such as bis-(1-ethyl-3-methyl pentyl)amine and ethoxylated amines including N-lauryl diethanolamine, N-tallow diethanolamine, N-stearyl diethanolamine and N-coco diethanolamine.

Additional useful liquids comprise aromatic amines including N-sec-butylaniline, dodecylamine, N,N-dimethylaniline, N,N-diethylaniline, p-toluidine, N-ethyl-o-toluidine, diphenylamine and aminodiphenylmethane, diamines including N-erucyl-1,3-propane diamine and 1,8-diamino-p-methane, other amines including branched tetramines and cyclodecylamine, amides including cocoamide, hydrogenated tallow amide, octadecylamide, erucamide, N,N-diethyl toluamide and N-trimethylopropane stearamide, saturated aliphatic esters including methyl caprylate, ethyl laurate, isopropyl myristate, ethyl palmitate, isoproropyl palmitate, methyl stearte, isobutyl stearate and tridecyl stearate, unsaturated esters including stearly acrylate, butyl undecylenate and butyl oleate, alkoxy esters including butoxyethyl stearate and butoxyethyl oleate, aromatic esters including vinyl phenyl stearate, isobutyl phenyl stearate, tridecyl phenyl stearate, methyl benzoate, ethyl benzoate, butyl benzoate, benzyl benzoate, phenyl laurate, phenyl salicylate, methyl salicylate and benzyl acetate and diesters including dimethyl phenylene distearate, diethyl phthalate, dibutyl phthalate, di-iso-octyl phthalate, dicapryl adipate, dibutyl sebacate, dihexyl sebacate, di-iso-octyl sebacate, dicapryl sebacate and dioctyl maleate. Yet other useful liquids comprise polyethylene glycol esters including polyethylene glycol (having a number of average molecular weight of about 400), diphenylstearate, polyhydroxylic esters including castor oil (triglyceride), glycerol monostearate, glycerol monooleate, glycol distearate glycerol dioleate and trimethylol propane monophenylstearate, ethers including diphenyl ether and benzyl ether, halogenated compounds including hexachlorocyclopentadiene, octabromobiphenyl, decabromodiphenyl oxide and 4-bromodiphenyl ether, hydrocarbons including 1-nonene, 2-nonene, 2-undecene, 2-heptadecene, 2-nonadecene, 3-eicosene, 9-nonadecene, diphenylmethane, triphenylmethane and trans-stilbene, aliphatic ketones including 2-heptanone, methyl nonyl ketone, 6-undecanone, methylundecyl ketone 6-tridecanone, 8-pentadecanone, 11-pentadecanone, 2-heptadecanone, 8-heptadecanone, methyl heptadecyl ketone, dinonyl ketone and distearyl ketone, aromatic ketones including acetophenone and benzophenone and other ketones including xanthone. Still further useful liquids comprise phosphorus compounds including trixylenyl phosphate, polysiloxanes, Muget hyacinth (An Merigenaebler, Inc.), Terpineol Prime No. 1 (Givaudan-Delawanna, Inc.), Bath Oil Fragrance #5864 K (International Flavor & Fragrance, Inc.), Phosclere P315C (organophosphite), Phosclere P576 (organophosphite), styrenated nonyl phenol, quinoline and quinzlidine.

To form microporous polymer products with polystyrene, useful liquids include tris-halogenated propylphosphate, aryl, alkyl phospnites, 1,1,2,2, tetrabromoethane, tribromoneopentyalcohol, 40% Voranol C.P. 3000 polyol and tribromoneopentyl alcohol 60%, tris-$\beta$-chloroethylphosphate, tris(1,3-dichloroisopropyl) phosphate, tri(dichloropropyl) phosphate, dichlorobenzene, and 1-dodecanol.

In forming microporous polymers using polyvinyl chloride, useful liquids comprise aromatic alcohols including methoxy benzyl alcohol, 2-benzylamino-1-propanol, and other hydroxyl-containing liquids including 1,3-dichloro-2-propanol. Still other useful liquids comprise halogenated compounds including Firemaster T33P (tetrabromophthalic diester), and aromatic hydrocarbons, including trans-stilbene.

In addition, microporous products have been made from other polymers and copolymers and blends. Thus, to form microporous products from styrene-butadiene copolymers, useful liquids include decyl alcohol, N-tallow diethanol amine N-coco diethanol amine and diphenyl amine. Useful liquids for forming microporous polymers from ethylene-acrylic acid copolymer salts include N-tallow diethanolamine, N-coco diethanolamine, dibutyl phthalate and diphenyl ether. Microporous polymer products using high impact polystyrene can be formed by employing as liquids, hexabromobiphenyl and alkyl/aryl phosphites. With "Noryl" polyphenylene oxidepolystyrene blends (General Electric Company), microporous polymers can be made utilizing N-coco diethanol amine, N-tallow diethanolamine, diphenylamine, dibutyl phthalate and hexabromophenol. Microporous polymers from blends of low density polyethylene and chlorinated polyethylene can be made by utilizing 1-diethanolamine. Utilizing 1-dodecanol as the liquid, microporous polymer products can be made from the following blends: polypropylene-chlorinated polyethylene, high density polyethylene-polyvinyl chloride and high density polyethylene and acrylonitrile-butadiene-styrene (ABS) terpolymers. To form microporous products from polymethylmethacrylate, 1-4,butanediol and lauric acid have been found to be useful. Microporous Nylon 11 may be made utilizing ethylene carbonate, 1,2-propylene carbonate, or tetramethylene sulfone. Also, menthol may be utilized to form microporous products from polycarbonate.

Furthermore, two or more liquids may be used simultaneously as the compatible liquid in forming the pores in the base polymer. An example of this technique is set forth in West German Patent Application No. 32 05 289, filed Feb. 15, 1982, and assigned to Akzo GmbH, a company affiliated with the assignee of this invention.

Process for producing the novel batts using the above described base polymers and compatible liquids is set forth below. Referring now to FIG. 1, the mixing unit 10 melts and blends the liquid and polymer combination until a homogeneous solution is formed. The mixing unit may be an extruder or a combination of a spinning vessel 11 and gear pump 13, as illustrated in FIG. 2. The gear pump is operated by pump drive 15. From the mixing unit, the homogeneous solution enters melt blowing die 12. Referring now also to FIG. 2, as the solution flows through duct 18, it passes through a plurality of holes and emerges from the die, and it is contacted at junction 24 by high temperature, high velocity primary air currents moving through channels 20 and 22. Thus, this primary air is provided on both sides of the solution. The air is heated by heater 16. The temperature of these air currents will normally range from 150° C. to 220° C., depending on the polymer used. This primary air draws the molten homogeneous solution as it leaves the die. A large volume of cooling air, referred to as secondary air, which may move along the surfaces 26 and 28 of the die, then contacts the solution, solidifying the solution into fibers and quenching the fibers. This cool air in certain circumstances such as, for example, on small lines, may be provided by cool ambient air. However, on larger lines, a mechanically generated source of cooling air is normally provided to maintain a temperature balance in the blowing area. The drawing and quenching of the fibers normally occurs at about 6 inches to 8 inches from the die tip. The fibers normally reach their final diameter and solidify at that point, and are quite cool several inches from the die face. Thus, the fiber forming occurs at a very high rate. However, it should be noted that the drawing and quenching distance is primarily determined by the type of polymer used.

Where a molten polymer was used which did not include the compatible liquid, it was found that the solid fibers emerging from the die were constantly breaking, forming fibers of a length of several inches to about 1 foot. However, where a homogeneous solution (polymer/liquid mixture) is utilized in the mixing unit, it has been found that each fiber is formed as a continuous filament which normally does not break during the process of forming the novel batt. It is believed that this occurs because the homogeneous solution utilized in this invention has a very low viscosity, from about 200 to 2,000 centipoise. Normally, when extruding a homogeneous solution using polypropylene as a base polymer, approximately 10% to 50% of the homogeneous solution will be polypropylene, and the remainder is the compatible liquid, thus accounting for the low viscosity.

Thus, one does not have to rely on the fibers joining each other in the batt by melt bonding to make an integral batt, because the filaments are continuous. One great advantage in that aspect lies in the ability to easily roll up the batt because of these continuous filaments.

The relative amounts of the base polymer to the compatible liquid will affect the pore size and the overall strength of the fiber. The amount of the liquid used should accordingly allow the resulting microporous structure to have sufficient minimum handling strength to avoid collapse of the microporous or cellular structure.

Also, the amount of polymer used should not be so great so as to result in closing off the cells or other areas of the microporosity, so that air cannot enter any of the cells. As an example, a useful material may be formed utilizing high density polyethylene as a base polymer and N,N-bis-(2-hydroxylethyl) tallowamine as the compatible liquid, using from about 30% to about 90% by weight of the compatible liquid as compared to the base polymer.

When polyproplyene is used as the base polymer along with the same compatible liquid mentioned in the preceding paragraph, the compatible liquid may be suitably employed in amounts of up to about 10% to 90%, with a maximum amount of no more than 85% being preferred. In order to form continuous filaments, however, in a polypropylene base polymer and N,N-bis-(2-hydroxylethyl)tallowamine compatible liquid mixture, it is preferred that the range be approximately 10% to 50% of polypropylene.

Referring again to FIG. 1, in the distance between die 12 and take-up screen 30, some entanglement of the fibers will occur. Normally, the collection distances are between 7 to 10 inches between the die and the take-up screen. The fibers lay down on the collector screen or wheel 30 in a continuous web having good web integrity. Fiber entanglement and surface attraction of the small fibers account for self-bonding, which occurs in the lay zone; however, with the use of continuous filaments, self-bonding is not necessary to form the batt.

As can be seen from FIG. 3, the fibers are very random. The batt strength is very good for subsequent handling and winding on take-up 30. Because of the high velocity air used in the formation of the fibers, the line speed does not affect the fiber properties. Thus, very heavy base weight batts produced at low line speeds will have similar fiber properties to light base weight batts produced at high line speeds. The batts described above may also be produced utilizing multiple dies which form batts on a conveyor belt type of arrangement.

Figure 5:
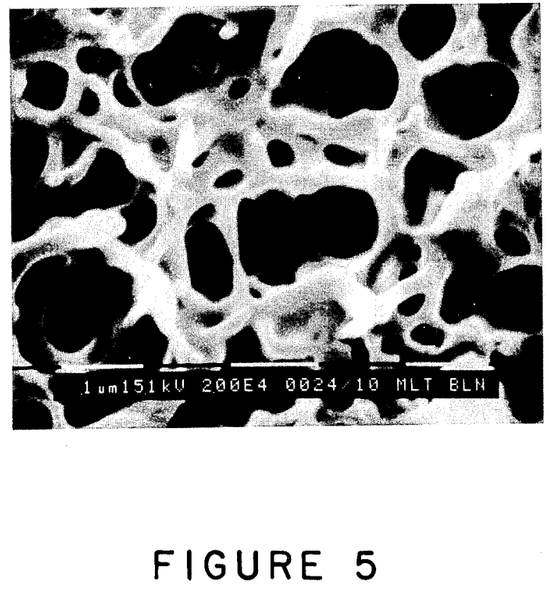
FIG. 5 is a photo-micrograph showing a cross section of one of the porous materials used in the subject invention.

The web material which has been taken up on wind-up 32 now includes a plurality of fibers formed of a base polymer having a compatible liquid impregnated in spherical shaped interconnecting chambers. The next step in the process is to extract the compatible liquid from the base polymer to form empty air-containing cells within the fibers. The liquid is extracted in accordance with U.S. Pat. No. 4,247,498. Normally, an alcohol is used to extract the compatible liquid. The batts are run through a standard extractor having an alcohol atmosphere. An example of such an alcohol which may be used is isopropyl alcohol. Once the compatible liquid has been extracted, the fibers in the batts includes spatially interconnected spherical micropores as shown in FIG. 5. After extraction, the webs or batts produced in the above process are typically from 75% to 85% porous, depending upon the polymer/compatible liquid ratio, e.g., starting with 15% base polymer and 85% compatible liquid, the void volume will typically be 85%.

In order to determine whether or not the porous polymer forming method taught in U.S. Pat. No. 4,247,498 would work to produce porous fibers utilizing the melt blowing techniques set forth above, the following experiments set forth in the Examples 1 through 4 below were done:

EXAMPLE 1

1,050 grams of polypropylene furnished by Exxon was added to 1890 ml of soybean oil and 630 ml of castor oil, the oils being the compatible liquid. The weight ratios were 28.4% polypropylene, 53.7% soybean oil, and 17.9% castor oil. All these materials were placed into the mixing unit illustrated in FIG. 1 and heated to 200° C. with the die head temperature being 390° F. The hot air coming through channels 20 and 22 was at 309° F., with the air flow being 5 scfm. The distance from the spinneret to the take-up was varied between 18 and 24 inches. Isopropyl alcohol was used as the extraction media. Tests were conducted to determine if the percentage of polyproplyene remained as originally mixed in the solution of the polypropylene/soybean oil/castor oil during the time period of the run. The first sample was extracted from a six minute run. The unextracted weight was 2.874 grams. The extracted weight was 0.8821 grams, or 30.7% polypropylene.

EXAMPLE 2

The process was the same as in Example 1, except that the ten minute extraction time period expired. The unextracted weight was 3.924 grams. The extracted weight was 1.2084 grams, or 30.8% polyproplyene.

EXAMPLE 3

The process was the same as in Example 1, except that a twelve-minute extraction time period was elapsed. The unextracted weight was 4.5678 grams. The extracted weight was 1.3974 grams or 30.6% polypropylene.

The solution mix after extractopm for each of the above three examples was approximately 30% polypropylene, 52% soy oil, and 18% castor oil. These above examples show that substantially all of the compatible liquid was extracted from the polypropylene fiber batt. The fibers were photographed as shown in FIGS. 4–5, revealing a substantial number of interconnected spherically shaped voids similar to the micropores shown in U.S. Pat. No. 4,247,498.

EXAMPLE 4

Samples of the porous blown fibrous batts of the subject invention listed below as A through E with the liquid extracted were tested for their thermal conductivity using an AGA Infrared analyzer under both load and no-load conditions with the samples having various pore sizes. The AGA Infrared analyzer was supplied by AGA Corporation of Secaucus, N.J. The insulation efficiency was determined by placing samples of the batts on a 90° C. steam table in a 29° C. room. The equilibrium surface temperatures of the batts were then measured using the AGA infrared. If this surface temperature was low, the batt was a good insulator and had a high percentage efficiency as calculated using the following formula:

$$\% \text{ efficiency} = 90° C. - \frac{\text{surface temperature}}{90° C. - 29° C.}$$

The samples were tested under load using a 36 square inch plate weighed to 4¾ lbs., with a pressure of 0.13 lbs. per square inch to simulate the loading in the sleeping bag. These samples were compared with DuPont's Sontique and 3M's Thinsulate as set forth in the chart below:

| Sample | Ratio of Liquid to Polypropylene | MFI | Density, gms/cm | Insulating % Efficiency | |
|---|---|---|---|---|---|
| | | | | No-Load | Load |
| A | 80/20 | 300 | 0.51 | 62 | 55 |
| B | 60/40 | 300 | 0.46 | 64 | 54 |
| C | 70/30 | 300 | 0.56 | 67 | 55 |
| D | 70/30 | 25 | 0.43 | 62 | 49 |
| E | 70/30 | 8 | 0.36 | 59 | 46 |
| Sontique | — | — | 0.24 | 61 | 20 |
| Thinsulate | — | — | 0.17 | 66 | 26 |

The above samples A–E were evaluated for water vapor pickup. The batts were placed on top of a beaker containing water at 100° F. for six hours. They were weighed both before and after six hours. The results were 0 water vapor pickup for all samples.

EXAMPLE 5

An additional water test was conducted with all seven samples of Example 4. Each batt listed below was placed in a pan with a blotter and a 2 lb. weight on top. Water was poured into the pan until half of the batt was submerged. After six hours, the samples were taken out and weighed. The results are shown on the following chart:

| Sample | MFI | Mix Ratio, Liquid/PP | Water Pick-Up, % | Blotter |
|---|---|---|---|---|
| A | 300 | 80/20 | 8.1 | Dry |
| B | 300 | 60/40 | 21.3 | Dry |
| C | 300 | 70/30 | 129.6 | Dry |
| D | 25 | 70/30 | 6.4 | Dry |
| E | 8 | 70/30 | 8.1 | Dry |
| Sontique | — | — | 120.6 | Dry |
| Thinsulate | — | — | 55.1 | Dry |

As can be seen, the samples A–E of the subject invention are shown to be substantially more hydrophobic than the Sontique or the Thinsulate except for sample C, which turned out to contain an excess amount of unextracted pore-forming liquid because of contamination.

The liquid water vapor pickup and transport was tested mainly because of the possibility of using the insulation material in sleeping bags which might be partially submersed in liquid water. This could result in reduced insulating performance (high water gain) or transport of the water to the individual using the bag.

The lack of moisture pickup is due to the hydrophobic nature of the polypropylene, notwithstanding the pores.

EXAMPLE 6

The below listed three samples of batts were tested for Thermal Conductivity/Thermal Resistance in accordance with the procedures outlined in ASTM C-177. The sample of the subject invention was made of a polypropylene material with the pores formed by the extension of a mixture of soybean oil and castor oil. Before extraction of the oils, the material was 30% polypropylene, 52% soybean oil and 18% castor oil by weight.

|  | DuPont Sontique | 3M Thinsulate | Subject Invention |
| --- | --- | --- | --- |
| Test Thickness, In. | 0.402 | 0.457 | 0.515 |
| Average Test Temperature, °F. | 74.45 | 74.81 | 75.42 |
| Thermal Conductivity, (k) Btu-in/hr-ft$^2$-°F. | 0.241 | 0.244 | 0.239 |
| Thermal Resistance (R) Hr-ft$^2$-°F./Btu | 1.67 | 1.91 | 2.15 |

EXAMPLE 7

The samples of Example 5 were again tested for Thermal Conductivity/Thermal Resistance in accordance with the procedures outlined in ASTM C-177, except that the samples were compressed to 50% of their original thickness except the sample of the subject invention, which could only be compressed to 59% of its original thickness.

|  | DuPont Sontique | 3M Thinsulate | Subject Invention |
| --- | --- | --- | --- |
| Test Thickness, In. | 0.199 | 0.227 | 0.304 |
| Average Test Temperature, °F. | 75.39 | 75.20 | 74.46 |
| Thermal Conductivity, (k) Btu-in/hr-ft$^2$-°F. | 0.217 | 0.220 | 0.245 |
| Thermal Resistance (R) Hr-ft$^2$-°F./Btu | 0.92 | 1.03 | 1.24 |

In addition to the use of polypropylene as a primary polymer, one may also utilize nylon 6 with glycerine as the compatible liquid. Nylon 6 may be a better performer in batts because of its higher melting point and better recovery after load. The glycerine can be extracted using water, making the extraction and recovery steps much easier. However, because nylon batts would be hydrophilic, they would not be as suitable for the insulations visualized for polypropylene. Both nylon and polypropylene batts, however, would find use in controlled release situations such as, for example, pores in the fibers of the batts loaded with nicotine with the batt being used as a smokeless cigarette. Furthermore, polyproplyene batts will selectively absorb oil from mixtures of water and oil, and nylon batts will absorb water from mixtures of oil and water.

EXAMPLE 8

To illustrate the oil absorbency of a polypropylene bath, the below experiments were conducted on three batts of the subject invention. The following mixtures were made up using cutting oil and water:

|  | Oil/Water (by volume) | Oil/Water (by weight) |
| --- | --- | --- |
| Mixture A | 5%/95% | 4.5 g/95 g |
| Mixture B | 50%/50% | 45 g/50 g |
| Mixture C | 95%/5% | 85 g/5 g |

Each mixture was stirred and then timed for separation. Below are the results:

| A | 51 seconds |
| --- | --- |
| B | >60 minutes |
| C | >60 minutes |

Three samples of a porous fiber polypropylene batt were cut and placed into Buckner funnels. Prior to extraction of the compatible liquid, the batts were 70% N,N-bis-B-hydroxyethyl tallow amine and 30% polypropylene. Each mixture was stirred and then poured into a funnel containing the batt. Observation results are as follows:

Sample A—As the 100 ml of mixture was poured into the funnel, some of the oil penetrated the batt. This allowed the water to penetrate the batt also. As the water filtered through, the remaining oil now on top penetrated into the batt. The solution collected in the flask was all water. 100 ml of additional water was poured into the funnel which filtered on into the flask. All of the oil appeared to be left in the batt. Filtering time was 14 minutes.

Sample B—This mixture was evaluated the same as for Sample A. However, both oil and water filtered on into the flask once the batt became saturated with oil. Filtering time was one hour and 18 minutes.

Sample C—This mixture was also evaluated the same as Sample A. The oil immediately saturated the batt and filtered into the flask along with the 5% water. Filtering time was 6 minutes.

Another batt was also evaluated to determine amount of oil needed to completely saturate the batt. Also, a sample of "Safety Absorbent", not made in accordance with the subject invention, used to absorb oil on floors, etc., was evaluated. The Safety Absorbent was supplied by Maltan, Inc., of Middleton, Tenn. Below are the results.

|  | Batt of the Subject Invention | Safety Absorbent |
| --- | --- | --- |
| Dry | 2.4 g | 8.0 g |
| Oil Saturated | 44.0 g. | 14.7 g. |
| % Pick-up | 1733 | 83.8 |

A 500 ml mixture of 99.5% water and 0.5% cutting oil was prepared. This mixture was placed in a 250 ml container. A fourth sample of a porous polypropylene batt (0.7 grams) was placed into the solution for 24 hours. Observation showed that the batt absorbed some of the oil.

Thus, it may be seen from the above examples and disclosures that a unique fibrous batt has been provided having various uses ranging from an improved thermal insulator to a controlled release material to an oil and water separator.

From the foregoing description of the preferred embodiments of this invention, it will be apparent that the description is a mere exemplification of the invention, and that the invention is not limited thereto. If is therefor intended in the appended claims to cover the true spirit and scope of this invention.

We claim:

1. A fiberous batt comprising a plurality of synthetic fibers arranged in random fashion relative to one another, forming a crush resistant lofted non-woven structure, each of said fibers being formed of a polymeric structure containing a three dimensional matrix of substantially interconnected spherically shaped void spaces, said fibers being formed by
   heating a mixture of a base polymer in a compatible liquid for a sufficient time to form a homogeneous solution;
   forcing said solution through a narrow die;
   blowing a gas onto said solution as said solution passes out of said dies;
   cooling said solution to form a plurality of fibers;
   collecting said fibers onto a substrate in a batt form; and
   removing a substantial portion of said compatible liquid from said polymer.

2. A batt as set forth in claim 1 wherein said void spaces have a diameter between 0.05 micron and 50 microns.

3. A batt as set forth in claim 1, wherein said void spaces have a diameter between 0.05 micron and 1.1 microns.

4. A batt as set forth in claim 1, wherein a substantial number of the void spaces have a diameter of approximately 0.4 micron.

5. A batt as set forth in claim 1, wherein the batt includes fibers having various diameters.

6. A batt as set forth in claim 1, wherein the diameters of said fibers range from 2 microns to 70 microns.

7. A batt as set forth in claim 1, wherein said batt is used as a thermal insulator.

8. A batt as set forth in claim 1, wherein heat transfer of said batt is substantially the same under a weight load as not under load.

9. A batt as set forth in claim 1, wherein said fibers are made from a hydrophobic polymer.

10. A batt as set forth in claim 9, wherein said polymer is taken from the group consisting of polypropylene and polyethylene.

11. A fiber as set forth in claim 9, wherein said material will absorb oil.

12. A batt as set forth in claim 1, wherein said material is hydrophilic and is taken from the group consisting of polyamide and polymethylacrylate.

13. A batt as set forth in claim 1, further including a material in the void space, said material adapted to be slowly released from said batt.

14. A batt as set forth in claim 13, wherein said material to be released is nicotine.

15. A method of producing a batt having a plurality of fibers which are substantially continuous filaments forming a fibrous non-woven batt with the fibers each having a plurality of pores therein comprising the steps of:
   heating a mixture of a base polymer in a compatible liquid for a sufficient time to form a homogeneous solution;
   forcing said solution through a narrow die;
   blowing a gas onto said solution as said solution passes out of said die;
   cooling said solution to form a plurality of fibers;
   collecting said fibers onto a substrate in a batt form; and
   removing a substantial portion of said compatible liquid from said polymer, leaving pores in said fibers.

16. The process as set forth in claim 15, wherein said base polymer is hydrophobic.

17. The process as set forth in claim 16, wherein said base polymer is taken from the group consisting of polypropylene and polyethylene.

18. A process as set forth in claim 15, wherein said base polymer is hydrophilic.

19. A process as set forth in claim 18, wherein said polymer is taken from the group consisting of polyamide and polymethylacrylate.

20. A process as set forth in claim 15, wherein said compatible liquid is N,N-bis(2-hydroxyethyl).

21. The process as set forth in claim 15, wherein said compatible liquid is a mixture of more than one material.

22. The process as set forth in claim 15, wherein said compatible liquid is a mixture of soybean oil and castor oil.

23. The process as set forth in claim 15, wherein said die includes at least one opening for the solution to pass through and at least one opening for a gas to pass through.

24. A process as set forth in claim 15, wherein said gas is air.

25. A process as set forth in claim 15, further including the step of passing cool air onto said material.

26. A process as set forth in claim 15, wherein the viscosity of said solution is from 200 to 2,000 centipoise.

27. The process as set forth in claim 26, wherein said fibers produced from said process are continuous filaments.

28. The process as set forth in claim 15, further including the step of rolling up said batt.

29. The process as set forth in claim 15, wherein said fibers are collected onto a screen mesh.

30. The process as set forth in claim 15, further including a step of forming a plurality of layers of said fibers.

31. The process as set forth in claim 15, wherein the material for removing the compatible liquid is an alcohol.

32. A method of using a fibrous batt as a thermal insulator, said batt including a plurality of synthetic fibers arranged in random fashion relative to one another, forming a lofted non-woven structure; said fibers formed of a polymeric structure containing a plurality of substantially spherically shaped void spaces, comprising the step of placing said batt between two sheets of textile material.

33. A method of using a fibrous batt as an oil and water separator, said batt including a plurality of synthetic fibers arranged in random fashion relative to one another, forming a lofted non-woven structure; said fibers formed of a polymeric structure containing a plurality of substantially spherically shaped void spaces, comprising the steps of applying said batt to a zone containing oil and water; permitting either the oil or the water but not both to be absorbed into said batt; removing said liquid ladened batt from said zone.

34. A method as set forth in claim 33, wherein said fibers are hydrophobic; said bath absorbing the oil but not the water.

35. A method as set forth in claim 34, wherein said fibers are made primarily of polypropylene.

36. A method as set forth in claim 33, wherein said fibers are hydrophilic, said bath absorbing the water but not the oil.

37. A method as set forth in claim 36, wherein said fibers are made primarily of polyamide.

38. A method of using a fibrous batt as a controlled release member, said batt including a plurality of synthetic fibers arranged in random fashion relative to one another, forming a lofted non-woven structure; said fibers formed of a polymeric structure containing a plurality of substantially spherically shaped void spaces, comprising the steps of placing said batt in a zone containing a liquid; permitting said liquid to be absorbed into said batt; removing said batt from said zone; permitting said liquid to be released from said batt.

39. A method as set forth in claim 38, wherein said liquid is nicotine.

40. A method as set forth in claim 39, further including the step of replacing the tobacco in a cigarette with said liquid ladened bath.

41. A method of using a fibrous batt as an oil and water separator, said batt including a plurality of synthetic fibers arranged in random fashion relative to one another, forming a lofted non-woven structure; said fibers formed of a polymeric structure containing a plurality of substantially spherically shaped void spaces, comprising the steps of pouring oil and water together onto said batt; permitting one substantial part of the oil or water, but not both, to be absorbed into said batt.

42. A method as set forth in claim 41, wherein the oil and not the water is absorbed into said batt.

* * * * *